(12) United States Patent
Kwon et al.

(10) Patent No.: US 8,880,132 B2
(45) Date of Patent: Nov. 4, 2014

(54) MOBILE TERMINAL HAVING ANTENNA

(75) Inventors: Oh Yong Kwon, Hwaseong-si (KR); Jeon Il Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 13/404,281

(22) Filed: Feb. 24, 2012

(65) Prior Publication Data

US 2013/0079069 A1   Mar. 28, 2013

(30) Foreign Application Priority Data

Sep. 23, 2011   (KR) .................. 10-2011-0096203

(51) Int. Cl.
| | |
|---|---|
| *H04M 1/00* | (2006.01) |
| *H01Q 13/16* | (2006.01) |
| *H01Q 1/52* | (2006.01) |
| *H01Q 1/24* | (2006.01) |
| *H01Q 1/48* | (2006.01) |

(52) U.S. Cl.
CPC .............. *H01Q 1/243* (2013.01); *H01Q 13/16* (2013.01); *H01Q 1/52* (2013.01); *H01Q 1/48* (2013.01)

USPC ............. 455/575.7; 455/575.3; 455/575.4; 455/575.5; 455/575.1; 343/725; 343/718; 343/878; 343/872

(58) Field of Classification Search
USPC ................ 455/575.7, 575.1, 575.2, 575.8
See application file for complete search history.

(56) References Cited

U.S. PATENT DOCUMENTS 7,747,294 B2 * 6/2010 Kwon ................ 455/575.1
2011/0193758 A1 * 8/2011 Liu et al. ................ 343/767

* cited by examiner

*Primary Examiner* — Charles Appiah
*Assistant Examiner* — Randy Peaches
(74) *Attorney, Agent, or Firm* — Jefferson IP Law, LLP

(57) ABSTRACT

A mobile terminal that can prevent radiation performance deterioration of an antenna is provided. The mobile terminal includes a circuit board in which an antenna and one or more key buttons are mounted, a housing mounted on the antenna and the circuit board, and a case for enclosing a periphery of the one or more key buttons and having a plurality of openings according to the quantity of the key buttons, wherein an antenna adjacent opening among the plurality of openings is extended through a slot toward an edge of the case to embody a loop antenna. Therefore, radiation deterioration of an antenna due to a case can be prevented. In addition, production costs can be minimized, and a desired external appearance of the mobile terminal is not compromised.

12 Claims, 12 Drawing Sheets ary embodiment of the present invention;

MOBILE TERMINAL HAVING ANTENNA

PRIORITY

This application claims the benefit under 35 U.S.C. §119 (a) of a Korean patent application filed on Sep. 23, 2011 in the Korean Intellectual Property Office and assigned Serial No. 10-2011-0096203, the entire disclosure of which is hereby incorporated by reference.

BACKGROUND OF THE INVENTION

1. Field of the Invention

The present invention relates to a mobile terminal having an antenna. More particularly, the present invention relates to a mobile terminal that can prevent radiation performance deterioration of an antenna.

2. Description of the Related Art

In order to reduce the thickness of a mobile terminal, to reinforce the strength thereof, and to improve the appearance of the mobile terminal, the outside of the mobile terminal is typically made of metal. Consequently, since using metal deteriorates the radiation performance of an antenna, in order to prevent radiation performance deterioration of the antenna, various design methods are applied.

A first design method is a method of separating a metal forming the outside of the mobile terminal from the antenna. According to such a design method, an injection material is used instead of metal at a lower end of the mobile terminal at which the antenna is positioned. However, a limitation exists in improving the appearance of the mobile terminal and in reinforcing the strength thereof.

A second design method is a method of forming a slot in a metal plate, such as a metal battery cover forming the outside of the mobile terminal. In such a design method, because a position, length, width, and shape of a slot corresponding to a specific frequency should be determined in a wide metal plate, such as the metal battery cover, extensive tuning must be performed. Further, due to such a slot, an external appearance of the mobile terminal is much deformed from an initially desired shape in view of a design.

A third design method is a method of connecting a metal forming the outside of the mobile terminal and a ground pad of an antenna. According to such a design method, because a connection part for connecting the metal and the ground pad of the antenna is added and a welding process of welding the connection part to the metal is added, production costs increases. In addition, as the connection part and a welding layer due to the welding process are added, a thickness of the mobile terminal increases.

Therefore, a need exists for a mobile terminal that can prevent radiation performance deterioration of an antenna due to an element made of metal forming the outside of the mobile terminal

SUMMARY OF THE INVENTION

Aspects of the present invention are to address at least the above-mentioned problems and/or disadvantages and to provide at least the advantages described below. Accordingly, an aspect of the present invention is to provide a mobile terminal that can prevent radiation performance deterioration of an antenna due to an element made of metal forming the outside of the mobile terminal.

Another aspect of the present invention is to provide a mobile terminal that can minimize production cost and deformation of a design according to coupling of constituent elements when preventing radiation performance deterioration of an antenna.

In accordance with an aspect of the present invention, a mobile terminal is provided. The mobile terminal includes a circuit board for mounting a main antenna, for processing a signal to be radiated, and for outputting the signal to the main antenna, and a housing, mounted on the main antenna and the circuit board, for embodying a loop antenna having a structure for passing through a circumferential area of at least one of key buttons in order to radiate, when a signal radiated from the main antenna is output, the output signal.

In accordance with another aspect of the present invention, a mobile terminal is provided. The mobile terminal comprises a circuit board in which an antenna and one or more key buttons are mounted, a housing mounted on the antenna and the circuit board, and a case for enclosing a periphery of the one or more key buttons and having a plurality of openings according to the quantity of the one or more key buttons, wherein an antenna adjacent opening among the plurality of openings is extended through a slot toward the edge of the case to embody a loop antenna.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 12, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
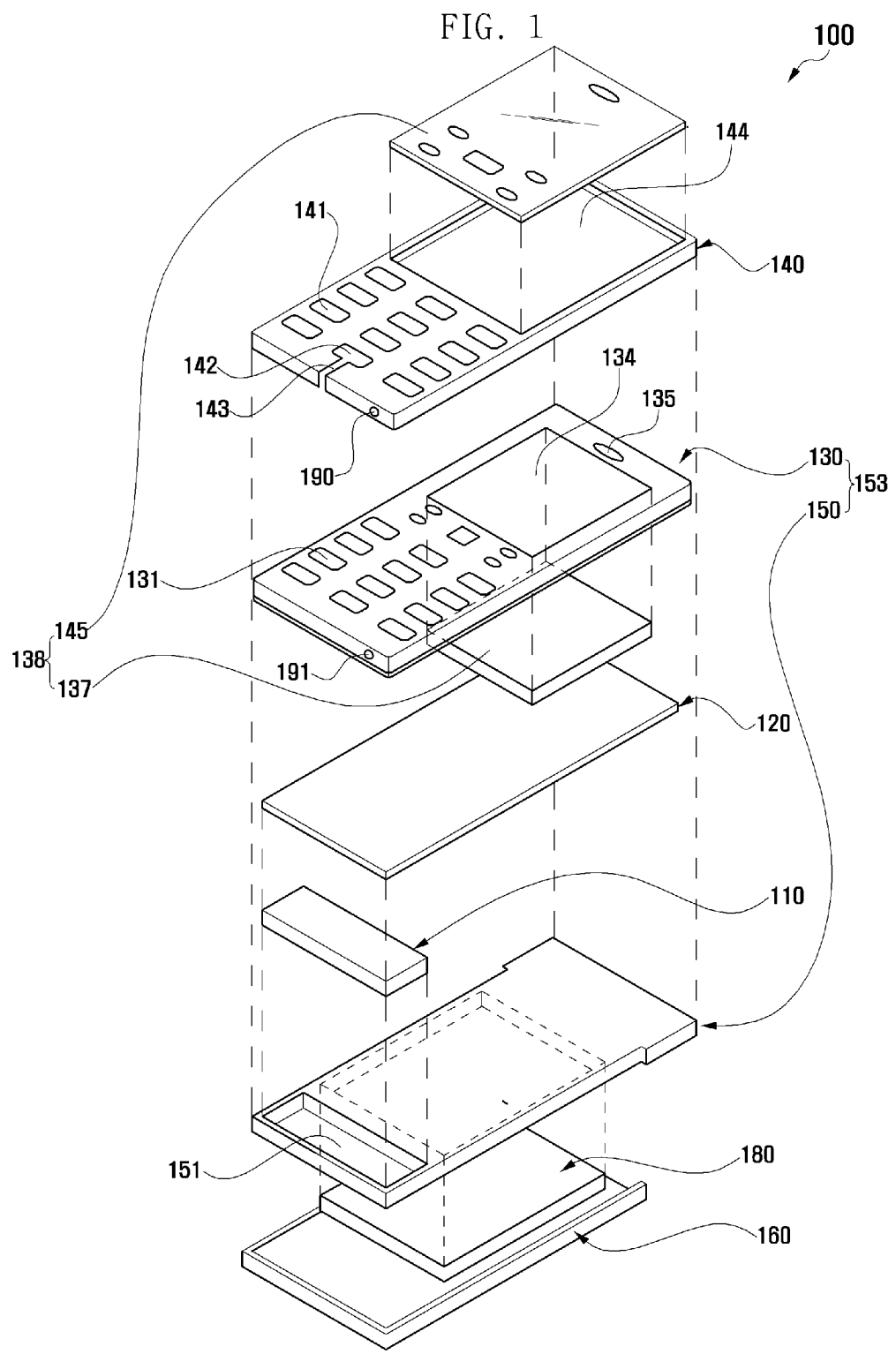
FIG. 1 is an exploded perspective view illustrating a mobile terminal according to an exemplary embodiment of the present invention.
Figure 2:
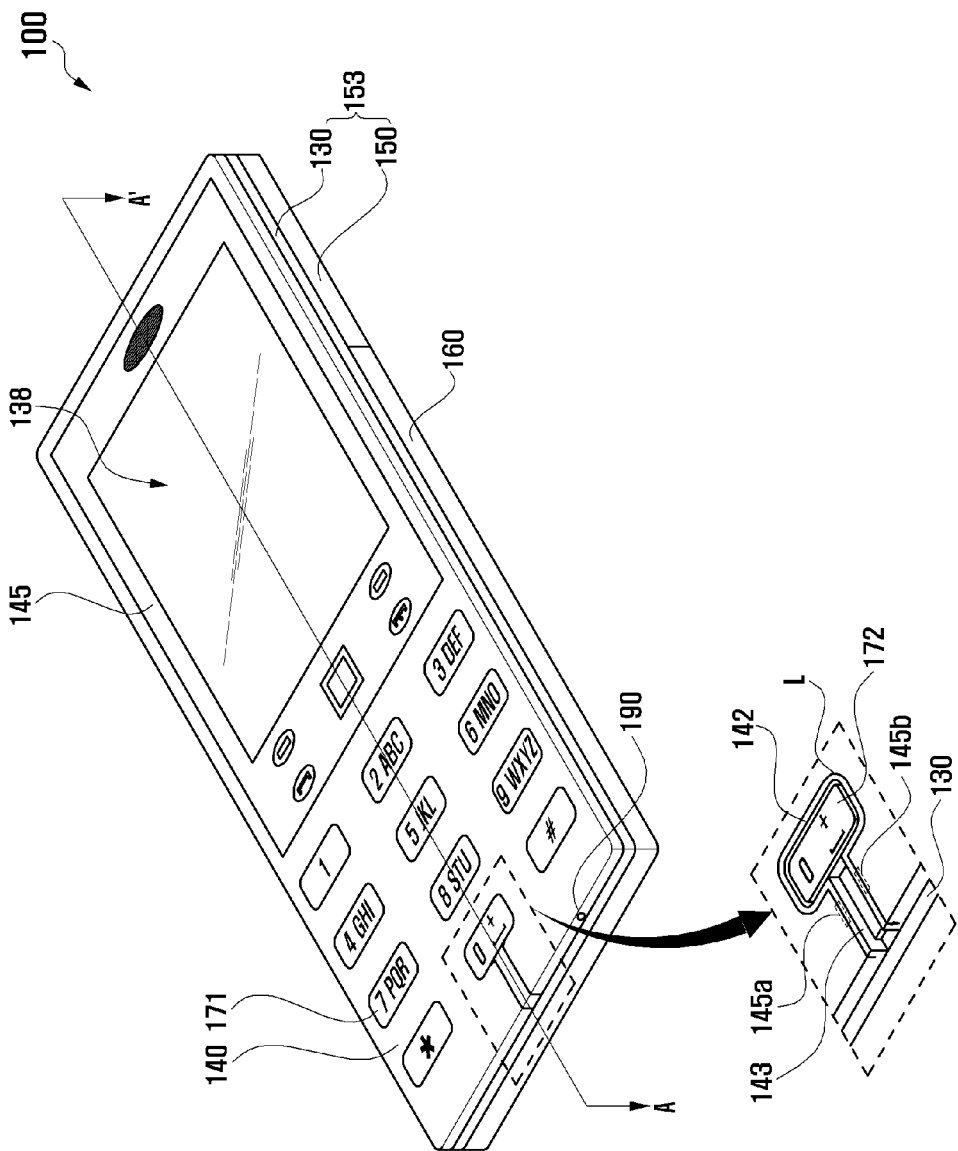
FIG. 2 is a coupled perspective view illustrating a mobile terminal according to an exemplary embodiment of the present invention.
Figure 3:
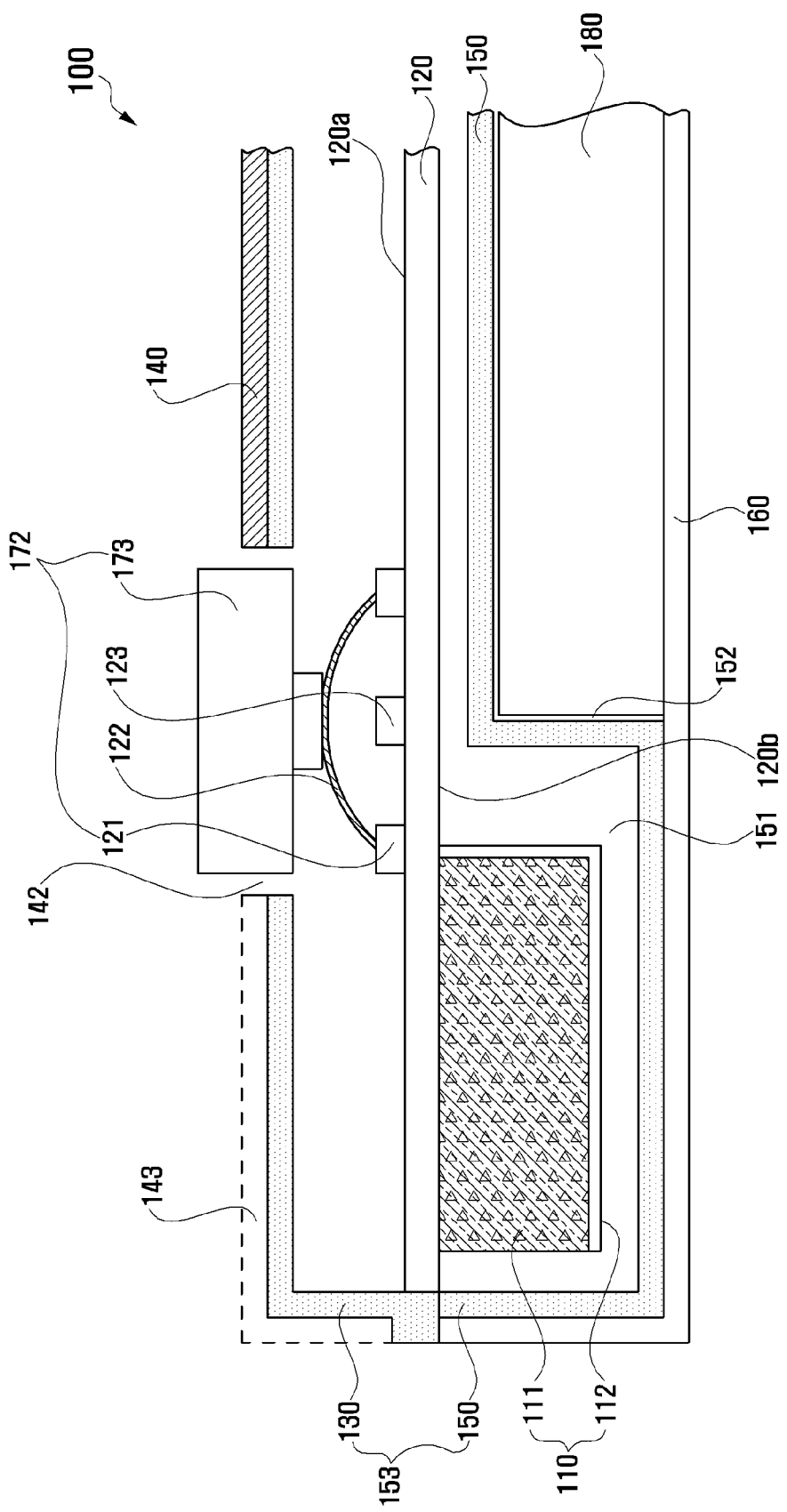
FIG. 3 is a partial cross-sectional view of the mobile terminal of FIG. 2 taken along line A-A' according to an exemplary embodiment of the present invention.

FIG. 1 is an exploded perspective view illustrating a mobile terminal according to an exemplary embodiment of the present invention, FIG. 2 is a coupled perspective view illustrating a mobile terminal according to an exemplary embodiment of the present invention, and FIG. 3 is a partial cross-sectional view of the mobile terminal of FIG. 2 taken along line A-A' according to an exemplary embodiment of the present invention. For reference, key buttons 171 and 172 are shown in FIGS. 2 and 3, but for convenience of description, key buttons 171 and 172 are not shown in FIG. 1.

Referring to FIGS. 1 through 3, a mobile terminal 100 includes an antenna 110, a circuit board 120, a display unit 138, a microphone (not shown), a case 140, a housing 153, a battery cover 160, key buttons 171 and 172, and a battery 180.

The antenna 110 radiates a signal in a resonant frequency band and is mounted at one surface of the circuit board 120. In the present exemplary embodiment, the antenna 110 may be referred to as a main antenna and may be mounted in a rear surface 120b of the circuit board 120, as shown in FIG. 3. The antenna 110 is a carrier antenna including a carrier 111 and an antenna pattern 112 formed in the carrier 111. However, the antenna 110 is not limited thereto and may be a Printed Circuit Board (PCB) antenna in which an antenna pattern is formed in the circuit board 120.

The key buttons 171 and 172 are means for inputting information, such as a phone number or a character, and are mounted in a front surface 120a of the circuit board 120. The key button 172 includes a dome terminal 121, a conductive dome 122, a substrate terminal 123, and a button portion 173. The conductive dome 122 is disposed at a lower part of the button portion 173, and the dome terminal 121 connected to a circumferential edge of the conductive dome 122 and the substrate terminal 123 disposed at the inside of the dome terminal 121 are formed at the front surface 120a of the circuit board 120. When a user presses the button portion 173, the conductive dome 122 and the substrate terminal 123 contact, and the dome terminal 121 and the substrate terminal 123 are electrically connected through the conductive dome 122. Accordingly, an electrical signal corresponding to a user input occurs in the key button 172.

The circuit substrate 120 mounts components, such as the antenna 110, the key buttons 171 and 172, and the microphone, and includes a controller (not shown) for processing a signal to be radiated from the antenna 110.

The display unit 138 displays an image to a user and includes a display 137 and a window 145. The display 137 is disposed at an upper part of the circuit board 120. The display 137 may be a Liquid Crystal Display (LCD) or an Active Matrix Organic Light Emitting Diode (AMOLED) and is connected to the circuit board 120 through a Flexible Printed Circuit Board (FPCB) (not shown). The window 145 is disposed at an upper part of the display 137, transmits an image of the display 137 to a user, and protects the display 137. The window 145 may be made of glass, PolyCarbonate (PC) or PolyEthylene Terephthalate (PET).

The microphone converts a user's voice to an electrical signal and outputs the electrical signal to the controller of the circuit board 120. In the present exemplary embodiment, the microphone is not shown in the drawings, but may be mounted in the front surface 120a of the circuit board 120.

The housing 153 includes a front housing 130 for housing the front side of the circuit board 120 and a rear housing 150 for housing the rear side of the circuit board 120. The front housing 130 and the rear housing 150 are made of an insulating material. The front housing 130 is disposed on the circuit board 120. The front housing 130 includes openings 131 for positioning the key buttons 171, a display space 134 for positioning the display 137, a receiver hole 135, and a microphone hole 191, as shown in FIGS. 1 and 2. A receiver (not shown) for outputting another party's voice to a user of the mobile terminal 100 is positioned within the receiver hole 135. The microphone hole 191 outputs a user's voice to the microphone and is formed in a lower end portion of the front housing 130. One end of the microphone hole 191 of the front housing 130 is connected to a microphone mounted in the circuit board 120, and the other end thereof is connected to a microphone hole 190 of the case 140. The rear housing 150 includes an antenna space 151 for positioning the antenna 110 and a battery space 152 for positioning the battery 180.

The case 140 forms the outside of the mobile terminal 100 and is mounted in the front housing 130. The case 140 is made of metal. The case 140 includes a plurality of openings 141 and 142 for passing through and exposing each of the key buttons 171 and 172, window space 144 for positioning the window 145, and the microphone hole 190. The plurality of openings 141 and 142 are arranged in a lattice structure in the case 140. Accordingly, in a portion forming the plurality of openings 141 in the case 140, metal portions of a plurality of character shapes '-' orthogonally intersect each other and thus have a lattice shape when viewing from the front side of the mobile terminal 100.

An antenna adjacent opening 142 adjacent to the antenna 110 among the plurality of openings 171 and 172 is extended toward the edge of the case 140 through a slot 143. In the present exemplary embodiment, the slot 143 is extended to the edge of the case 140. The case 140 forms a loop structure L in a peripheral area of the slot 143 and the antenna adjacent opening 142.

Electromagnetic waves radiated from the antenna 110 are induced to a pair of opposite metal portions 145a and 145b with the slot 143 interposed there between, and different electronic potentials occur in the pair of metal portions 145a and 145b. For example, it is assumed that an electric potential of the left metal portion 145a of the slot 143 is lower than that of the right metal portion 145b of the slot 143. In such a case, a current generated in the left metal portion 145a of the slot 143 flows along a peripheral area of the antenna adjacent opening 142 and arrives at the right metal portion 145b of the slot 143. Accordingly, in the case 140, as current flows along the loop structure L formed by a peripheral area of the slot 143 and the antenna adjacent opening 142, a loop antenna is embodied in the case 140. Accordingly, the case 140 radiates a signal output from the antenna 110.

In the present exemplary embodiment, the case 140 is a separate element that is not included in the housing 153. However, the housing 153 may include the case 140 as well as the front housing 130 and the rear housing 150. In such a case, a signal radiated from the main antenna 110 is output to the housing 153, and the housing 153 embodies a loop antenna while radiating again the output signal.

The battery 180 supplies power to the mobile terminal 100 and is disposed within the battery space 152 of the rear housing 150, as shown in FIG. 3. The battery cover 160 covers to protect the battery 180 from the outside and is mounted at the rear side of the rear housing 150 and the battery 180.

Figure 4:
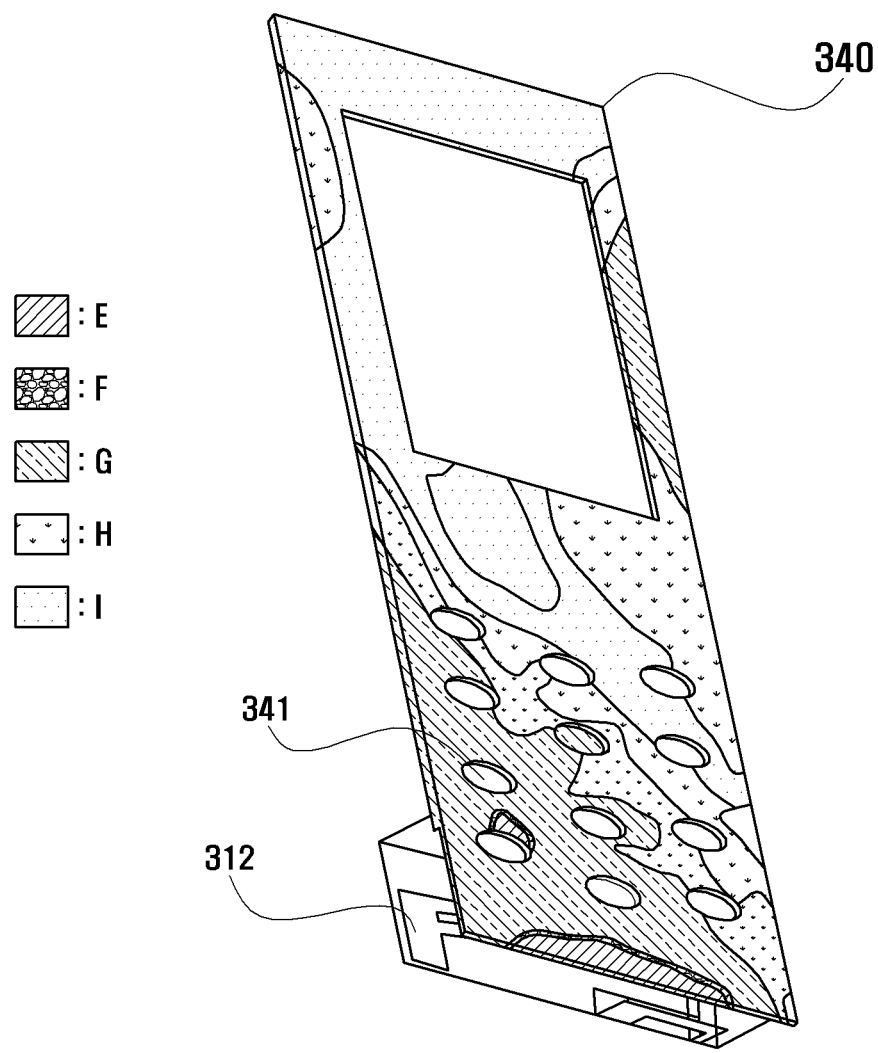
FIG. 4 is a diagram illustrating a simulation result of a case according to Comparative Example.
Figure 5:
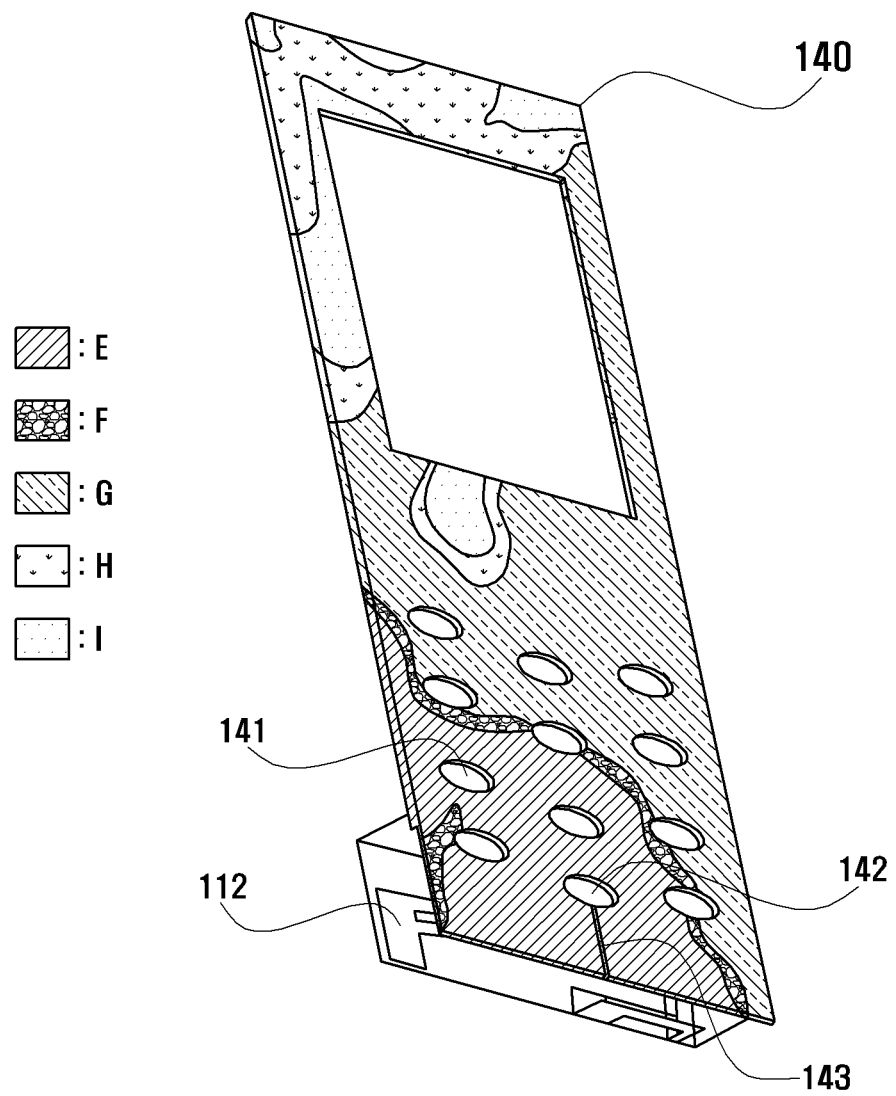
FIG. 5 is a diagram illustrating a simulation result of a case according to an exemplary embodiment of the present invention.

FIG. 4 is a diagram illustrating a simulation result of a case according to Comparative Example, and FIG. 5 is a diagram illustrating a simulation result of a case according to an exemplary embodiment of the present invention. For reference, a case 340 according to Comparative Example is different from the case 140 in that the slot 143 is not formed, but the remaining configurations of the case 340 according to Comparative Example are the same as those of the case 140.

Patterns E, F, G, H, and I shown in FIGS. 4 and 5 represent intensity of a current flow and define declining intensities of a current flow in order of a solid line pattern E, a gravel pattern F, a crossing pattern of solid and dotted lines G, a grass pattern H, and a point pattern I. That is, pattern E represents the strongest current flow.

Referring to FIG. 4, a portion adjacent to an antenna pattern 312 in the case 340 does not have a slot but has a continued form. A portion forming a plurality of openings 341 in the case 340 has a lattice shape. Accordingly, electromagnetic waves radiated from the antenna pattern 312 are output to the case 340, and a current is removed while repeatedly circulating along a metal portion having a lattice shape. Therefore, as shown in FIG. 5, a metal portion adjacent to an antenna pattern as well as a metal portion having a lattice shape does not represent a strong current flow.

Referring to FIG. 5, the antenna adjacent opening 142 adjacent to the antenna pattern 112 among a plurality of openings 141 and 142 of the case 140 is extended to the edge of the case 140 through the slot 143. Accordingly, in the case 140 shown in FIG. 5, even if a metal portion forming the plurality of openings 141 and 142 has a lattice shape, as in the case 340 shown in FIG. 4, a current flow of a peripheral area of the slot 143 and the antenna adjacent opening 142 and a periphery thereof is very strong, as represented by a solid line pattern E.

Figure 6:
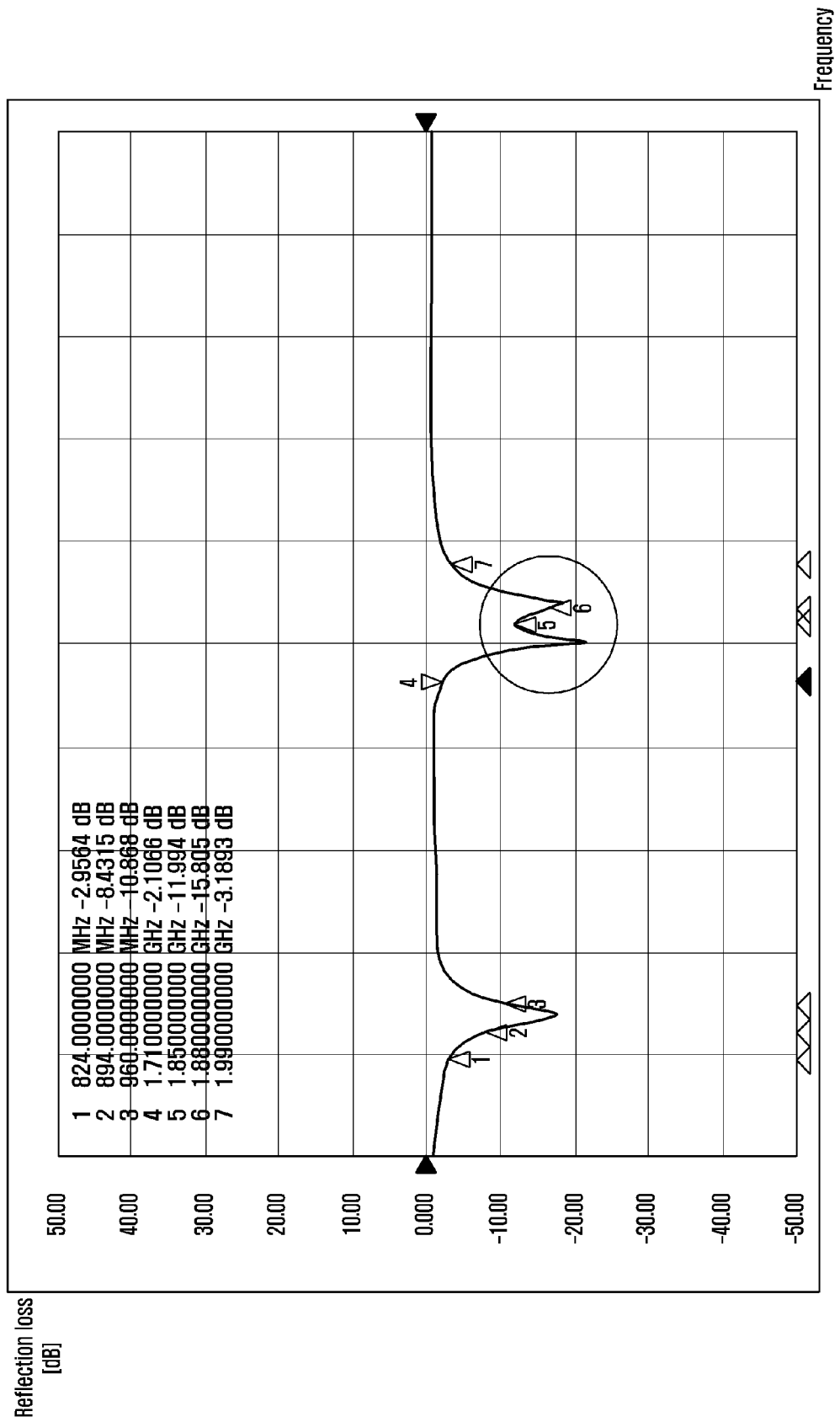
FIG. 6 is a graph illustrating reflection loss of an antenna of a mobile terminal according to Comparative Example.
Figure 7:
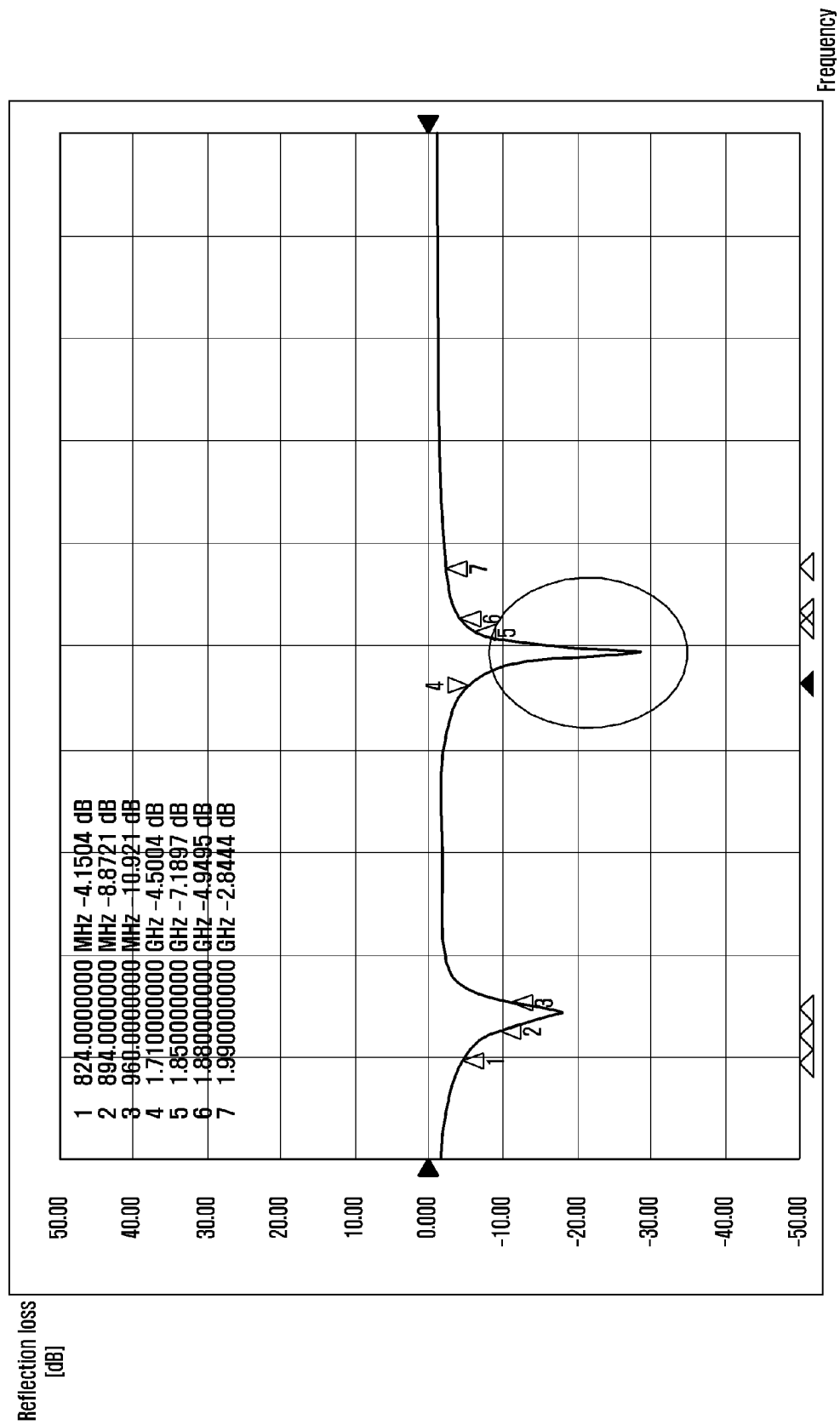
FIG. 7 is a graph illustrating reflection loss of an antenna of a mobile terminal according to an exemplary embodiment of the present invention.
Figure 8:
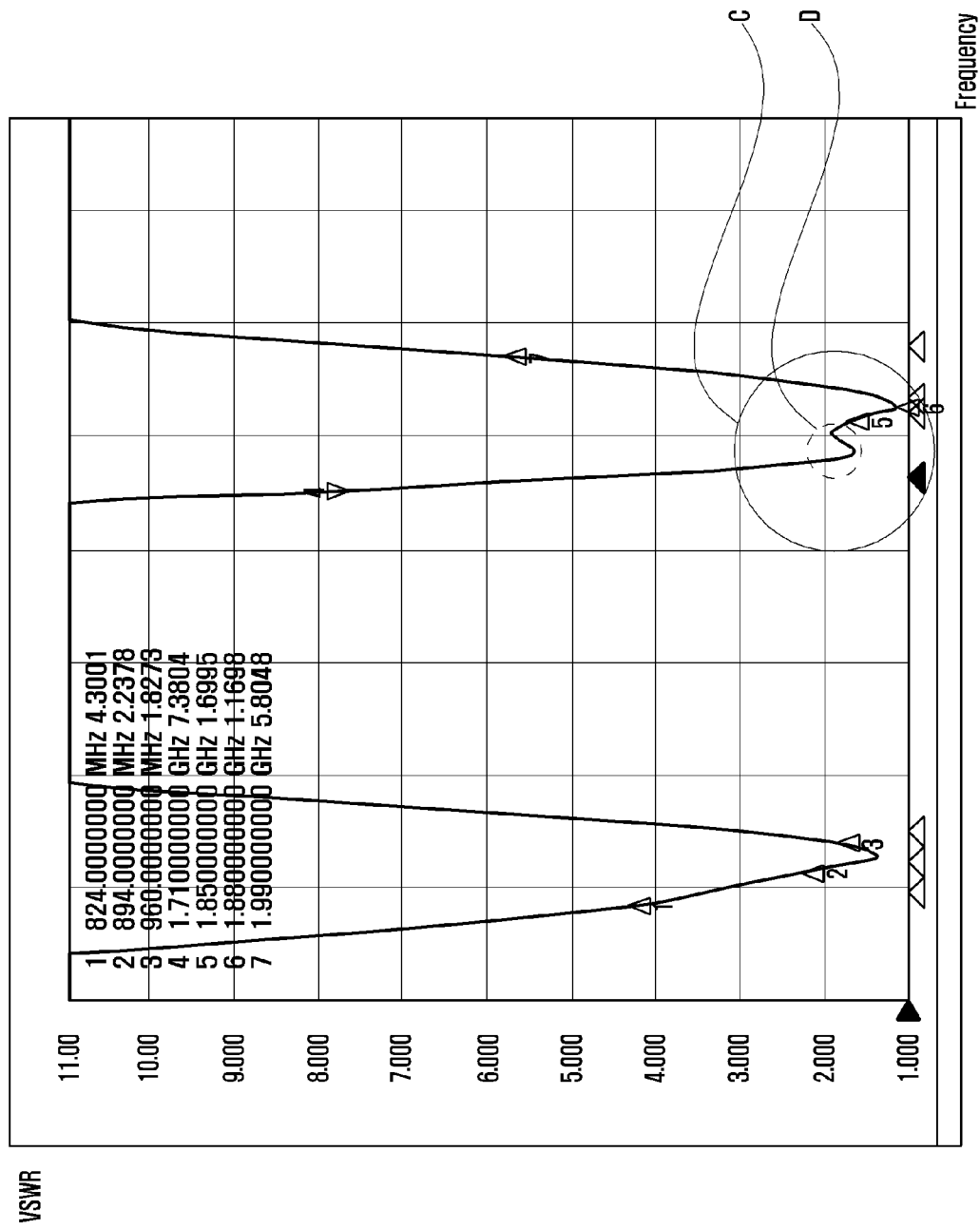
FIG. 8 is a graph illustrating a Voltage Standing Wave Ratio (VSWR) of an antenna of a mobile terminal according to Comparative Example.
Figure 9:
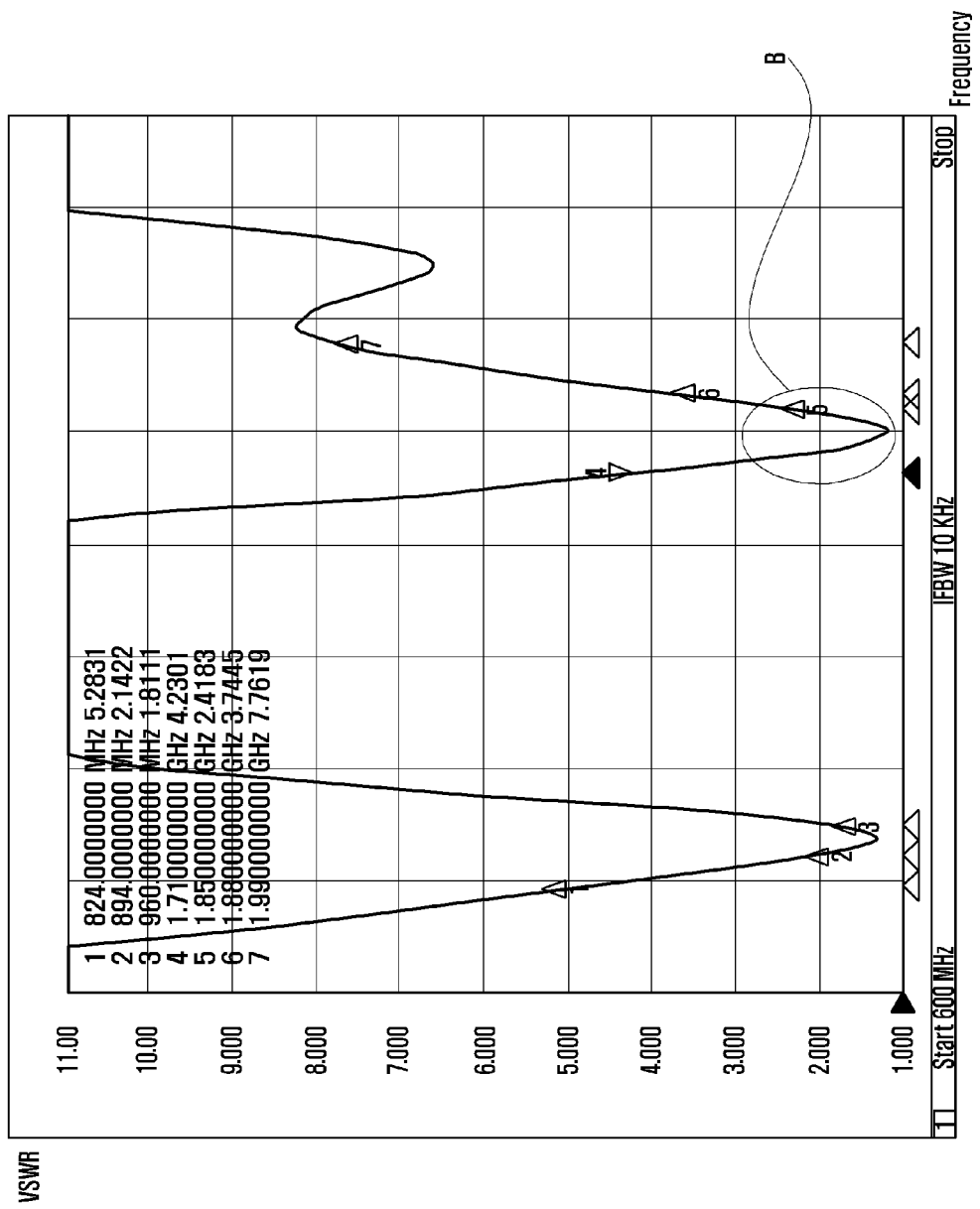
FIG. 9 is a graph illustrating a VSWR of an antenna of a mobile terminal according to an exemplary embodiment of the present invention.

FIG. 6 is a graph illustrating reflection loss of an antenna of a mobile terminal according to Comparative Example, FIG. 7 is a graph illustrating reflection loss of an antenna of a mobile terminal according to an exemplary embodiment of the present invention, FIG. 8 is a graph illustrating a Voltage Standing Wave Ratio (VSWR) of an antenna of a mobile terminal according to Comparative Example, and FIG. 9 is a graph illustrating a VSWR of an antenna of a mobile terminal according to an exemplary embodiment of the present invention. For reference, FIGS. 6 through 9 represent actual measured results, a mobile terminal (not shown) according to Comparative Example measured in FIGS. 6 and 8 is different from the mobile terminal 100 in that the slot 143 is not formed, but the remaining configurations of the mobile terminal (not shown) according to Comparative Example measured in FIGS. 6 and 8 are the same as those of the mobile terminal 100.

Referring to FIG. 6, the mobile terminal according to Comparative Example represents a peak of reflection loss of −20 dB in a high frequency band of 1.71 GHz to 1.99 GHz. However, referring to FIG. 7, the mobile terminal 100 represents a peak of reflection loss of −30 dB in a high frequency band of 1.71 GHz to 1.99 GHz. That is, the mobile terminal 100 has lower reflection loss in a higher frequency band than Comparative Example.

Referring to FIG. 8, the mobile terminal according to Comparative Example represents parasitic resonance D in a peak C of a VSWR in a high frequency band. However, referring to FIG. 9, the mobile terminal 100 does not represent parasitic resonance in a peak B of a VSWR in a high frequency band. That is, the mobile terminal 100 has a stabilized VSWR in a higher frequency band than Comparative Example.

Table 1 represents radiation efficiency of an antenna of the mobile terminal according to Comparative Example measured in FIGS. 6 and 8, and Table 2 represents radiation efficiency of an antenna of the mobile terminal measured in FIGS. 7 and 9.

TABLE 1

| Frequency (MHz) | Radiation efficiency (%) | Average (%) |
|---|---|---|
| 824 | 9 | 16.10 |
| 837 | 10 | |
| 849 | 12 | |
| 869 | 18 | |
| 881 | 21 | |
| 894 | 26 | |
| 880 | 19 | 29.13 |
| 896 | 27 | |
| 912 | 30 | |
| 928 | 33 | |
| 944 | 33 | |
| 960 | 32 | |
| 1710 | 6 | 14.22 |
| 1745 | 9 | |
| 1785 | 12 | |
| 1805 | 14 | |
| 1840 | 18 | |
| 1880 | 26 | |
| 1850 | 27 | 14.68 |
| 1880 | 16 | |
| 1910 | 13 | |
| 1930 | 10 | |
| 1960 | 11 | |
| 1990 | 10 | |

TABLE 2

| Frequency (MHz) | Radiation efficiency (%) | Average (%) |
|---|---|---|
| 824 | 7 | 15.81 |
| 837 | 10 | |
| 849 | 12 | |
| 869 | 18 | |
| 881 | 21 | |
| 894 | 27 | |
| 880 | 21 | 32.33 |
| 896 | 28 | |
| 912 | 33 | |
| 928 | 37 | |
| 944 | 38 | |
| 960 | 37 | |
| 1710 | 19 | 24.73 |
| 1745 | 30 | |
| 1785 | 29 | |
| 1805 | 28 | |
| 1840 | 26 | |
| 1880 | 16 | |
| 1850 | 19 | 20.59 |
| 1880 | 26 | |
| 1910 | 23 | |
| 1930 | 24 | |
| 1960 | 16 | |
| 1990 | 15 | |

Referring to Tables 1 and 2, the mobile terminal 100 has the same radiation efficiency as that of Comparative Example in a low frequency band of 824 MHz to 960 MHz and has radiation efficiency higher by 6 to 10% than that of Comparative Example in a high frequency band of 1710 MHz to 1990 MHz.

Table 3 represents receiving sensitivity and transmitting power of an antenna of a mobile terminal according to Comparative Example and the exemplary embodiment of the present invention measured in FIGS. 6 through 9. For reference, Global System for Mobile communications 850 (GSM850) has a frequency band of 824 MHz to 894 MHz, Extended GSM (EGSM) has a frequency band of 880 MHz to 960 MHz, Digital Communication System (DCS) has a frequency band of 1710 MHz to 1880 MHz, and Personal Communication System (PCS) has a frequency band of 1850 MHz to 1990 MHz. Furthermore, the unit of a numerical value described in Table 2 is dBm, and the 'difference' described in Table 3 is a value in which an average of Comparative Example is subtracted from an average of the exemplary embodiment of the present invention.

TABLE 3

| Frequency band | Channel | Comparative Example | | | | First exemplary embodiment | | | | Difference |
|---|---|---|---|---|---|---|---|---|---|---|
| | | Low | Middle | High | Average | Low | Middle | High | Average | |
| GSM850 | Sensitivity | −102.27 | −102.65 | −104.65 | −103.19 | −102.06 | −102.81 | −104.58 | −103.15 | 0.04 |
| | Power | 15.77 | 21.04 | 24.69 | 20.50 | 16.06 | 21.61 | 24.84 | 20.84 | 0.33 |
| EGS-M | Sensitivity | −105.47 | −104.85 | −104.73 | −105.02 | −105.81 | −105.22 | −105.86 | −105.30 | −0.28 |
| | Power | 27.66 | 27.81 | 28.23 | 27.90 | 27.61 | 27.62 | 28.21 | 27.81 | −0.08 |
| DCS | Sensitivity | −105.89 | −105.47 | −105.78 | −105.71 | −104.54 | −103.74 | −102.99 | −103.76 | 1.96 |
| | Power | 23.18 | 23.78 | 24.75 | 23.90 | 25.92 | 25.92 | 25.53 | 25.79 | 1.89 |
| PCS | Sensitivity | −104.74 | −104.12 | −102.90 | −103.92 | −100.27 | −99.36 | −99.03 | −99.55 | 4.37 |
| | Power | 22.83 | 22.48 | 22.38 | 22.56 | 24.72 | 25.33 | 26.11 | 25.39 | 2.82 |

Referring to Table 3, the mobile terminal 100 has the same receiving sensitivity and transmitting power as those of Comparative Example in a low frequency band of 824 MHz to 960 MHz and has receiving sensitivity and transmitting power higher by about 2 dBms to 4 dBms than Comparative Example in a high frequency band of 1710 MHz to 1990 MHz.

Figure 10:
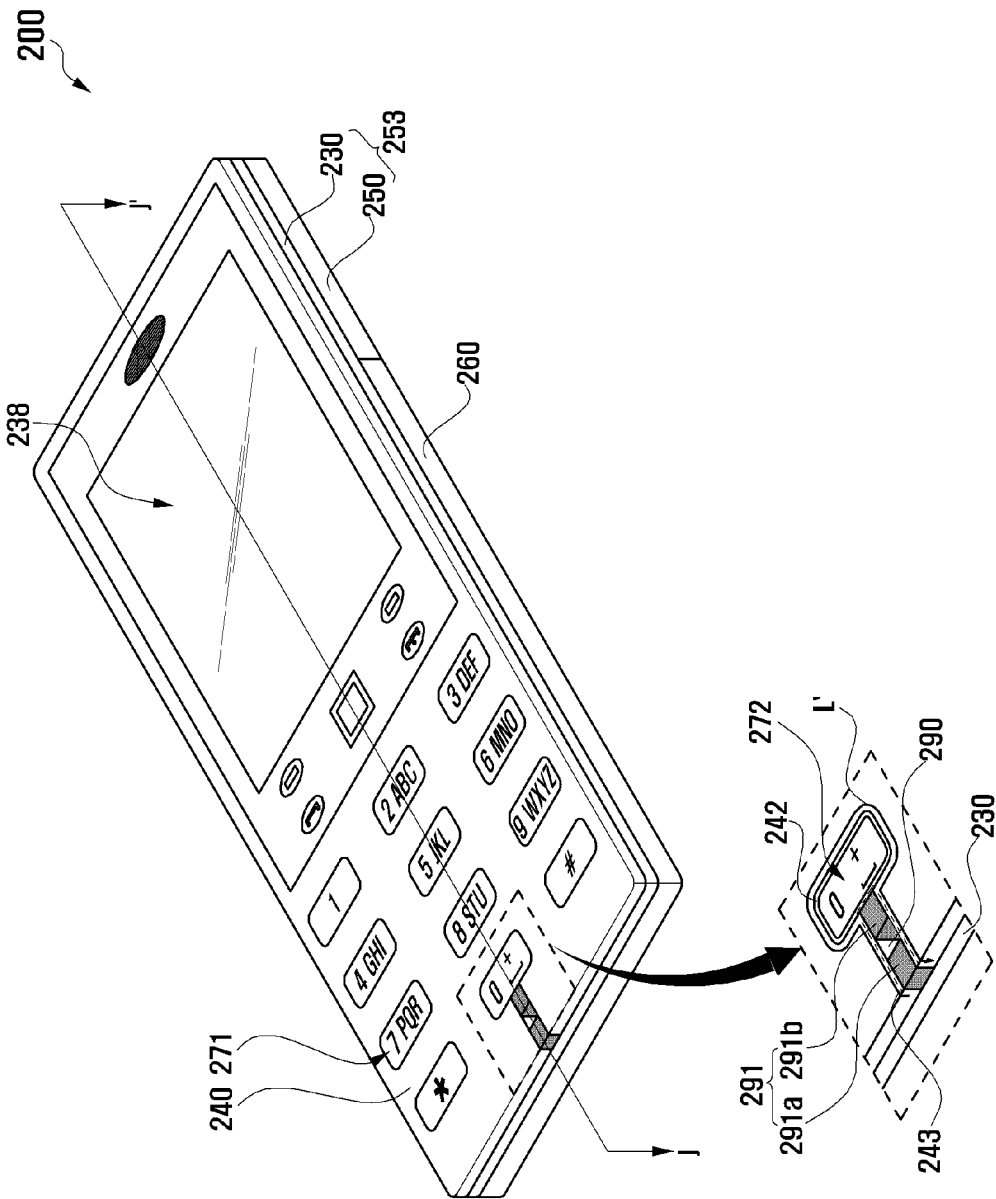
FIG. 10 is a perspective view illustrating a mobile terminal according to an exemplary embodiment of the present invention.
Figure 11:
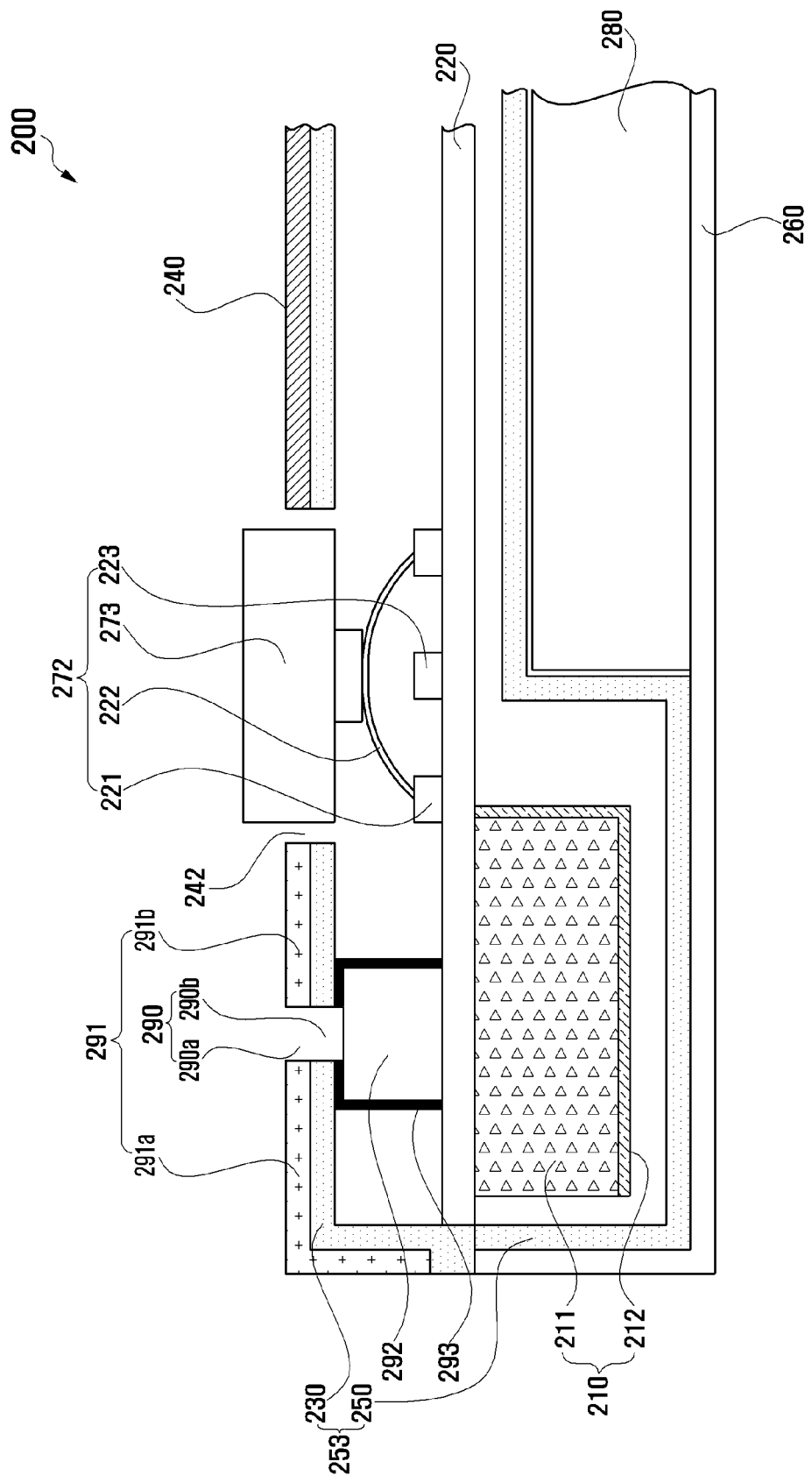
FIG. 11 is a partial cross-sectional view illustrating the mobile terminal of FIG. 10 taken along line J-J' according to an exemplary embodiment of the present invention.

FIG. 10 is a perspective view illustrating a mobile terminal according to an exemplary embodiment of the present invention, and FIG. 11 is a partial cross-sectional view of the mobile terminal of FIG. 10 taken along line J-J' according to an exemplary embodiment of the present invention.

Referring to FIGS. 10 and 11, a mobile terminal 200 includes an antenna 210, a circuit board 220, a display unit 238, a case 240, a housing 253, a battery cover 260, key buttons 271 and 272, a battery 280, and a microphone 292.

The antenna 210, the circuit board 220, the display unit 238, the battery cover 260, the key buttons 271 and 272, and the battery 280 have the same configuration as that of the exemplary embodiment of FIG. 2. That is, the antenna 210 includes a carrier 211 and an antenna pattern 212 formed in the carrier 211 and is mounted in the circuit board 220, and the key buttons 271 and 272 include a button portion 273, a conductive dome 222, a substrate terminal 223, and a dome terminal 221 and is mounted in the circuit board 220, and the circuit board 220 includes a controller (not shown) for processing a signal to be radiated from the antenna 210.

In an exemplary implementation, the microphone 292 is mounted in a portion adjacent to a slot 243 of a front surface of the circuit board 220, as shown in FIG. 11. Furthermore, a soundproof member 293 for preventing noise of the inside of the mobile terminal from being output to the microphone 292 may be attached to the outside of the microphone 292.

The case 240 has an insulating portion 291 forming a microphone hole 290 at the inside of the slot 243, unlike the case 140 of the exemplary embodiment of FIG. 2. The microphone hole 290 is connected to the microphone 292 mounted in the circuit board 220. The microphone hole 290 is formed by connecting a hole 290a formed by the insulating portion 291 and a hole 290b formed in a front housing 230. The insulating portion 291 includes a first insulating portion 291a and a second insulating portion 291b. In this case, as the first insulating portion 291a and the second insulating portion 291b are separated from each other in the slot 243, the microphone hole 290 is formed between the first insulating portion 291a and the second insulating portion 291b. The insulating portion 291 is formed by attaching a plastic piece to the front housing 230. In this case, by applying paints of the same color as that of the case 240 at a surface of the insulating portion 291, the appearance of the mobile terminal can be improved.

The housing 253 includes the front housing 230 and a rear housing 250 and has the same configuration as that of the housing 153 of the exemplary embodiment of FIG. 2 except that a hole 290b forming the microphone hole 290 is formed adjacent to the slot 243 in the front housing 230.

According to an exemplary implementation, the insulating portion 291 forming the microphone hole 290 is inserted into the slot 243. Accordingly, appearance deterioration of the mobile terminal 200 can be prevented by a portion exposed through the slot 243 in the front housing 230. Furthermore, because the insulating portion 291 does not have a conductive property, different electric potentials occur in a pair of opposite metal portions with the slot 243 interposed therebetween with the same method as that of the exemplary embodiment of FIG. 2. Accordingly, as current flows along a loop structure L' in a peripheral area of the slot 243 and the antenna adjacent opening 242 in the case 240, a loop antenna is embodied.

Figure 12:
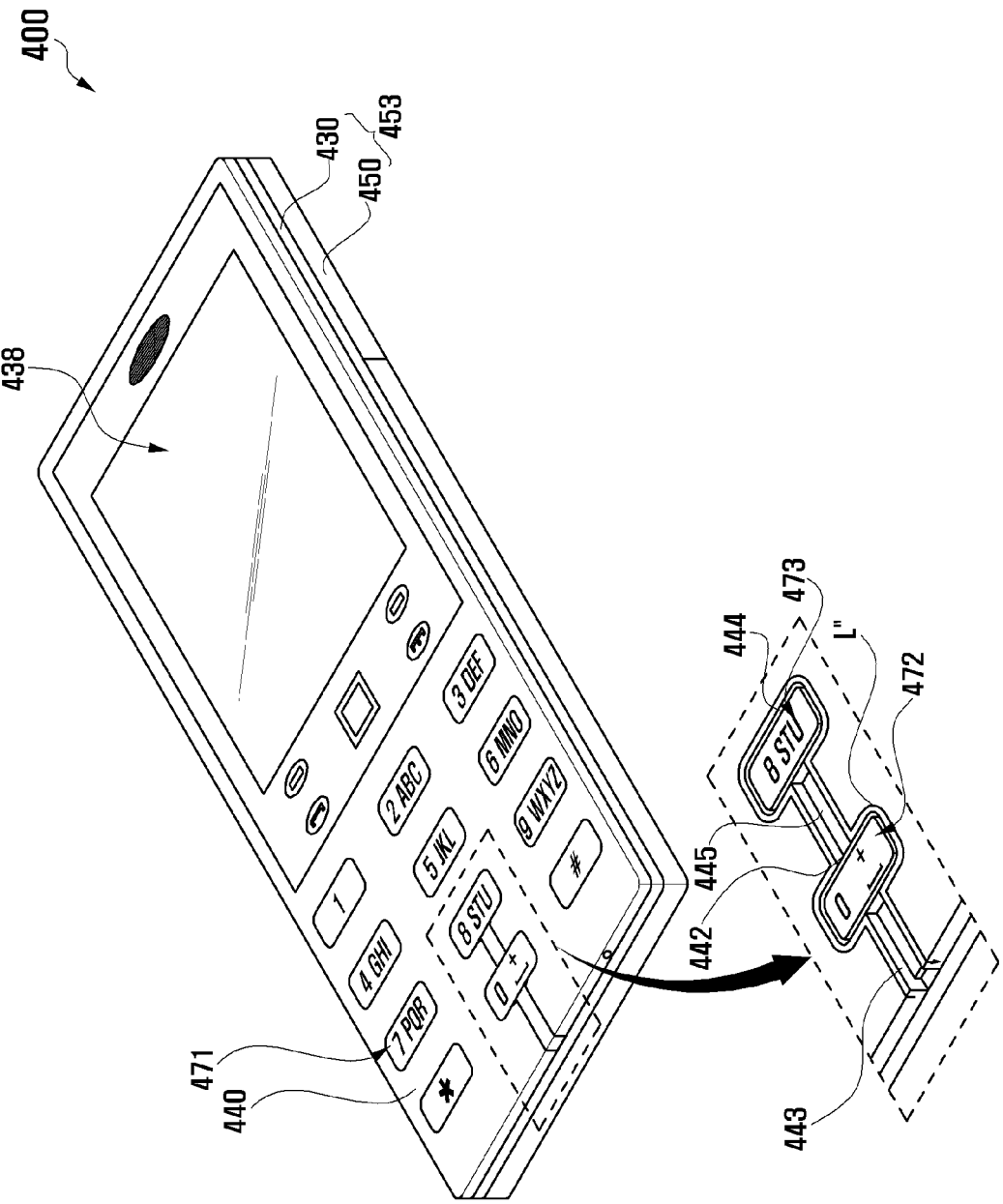
FIG. 12 is a perspective view illustrating a mobile terminal according to an exemplary embodiment of the present invention.

FIG. 12 is a perspective view illustrating a mobile terminal according to an exemplary embodiment of the present invention.

Referring to FIG. 12, a mobile terminal 400 includes a display unit 438, a housing 453, key buttons 471 and 472, and a case 440, wherein an antenna adjacent opening 442 extended to the edge through a slot 443 is extended to an opening 444 of the remaining openings through another slot 445 (hereinafter, an 'additional slot'). The housing 453 includes the front housing 430 and a rear housing 450 and has the same configuration as that of the housing 153 of the exemplary embodiment of FIG. 2 Accordingly, in the case 440, a loop structure L" formed by a peripheral area of each of the slot 443, the antenna adjacent opening 442, the additional slot 445, and the opening 444 connected to the antenna adjacent opening 442 through the additional slot 445 is formed longer than the loop L shown in FIG. 2. Therefore, a loop antenna embodied by the case 440 of this exemplary embodiment has a length longer than a loop antenna embodied by the case 140 of the exemplary embodiment of FIG. 2 and thus can radiate an antenna signal having a lower resonant frequency.

In FIG. 12, the additional slot 445 is extended to only one opening 444 of the remaining openings, however an additional slot may be extended to a plurality of openings of the remaining openings. For example, an additional slot may be connected to an opening of a key button '*' and an opening of a key button '#' as well as an opening 444 of a key button '8' 473.

According to an exemplary embodiment of the present invention, an antenna adjacent opening among a plurality of openings formed in a case is extended toward the edge of the case through a slot. Accordingly, electromagnetic waves radiated from the antenna are induced to a peripheral area of a slot in the case, and current of a loop shape flows through a peripheral area of the slot and the antenna adjacent opening in the case, and thus a loop antenna can be embodied in the case. Therefore, in a mobile terminal, radiation performance deterioration of an antenna due to a case can be prevented.

Because only a slot is formed in the case without connecting the case and a ground pad of the antenna, a separate material or manufacturing process is not added thereby preventing unnecessary production cost. Furthermore, because an opening for a key button of the case has a structure extended to an edge portion of the case through the slot, an external appearance of the mobile terminal can be prevented from being deformed from an initially desired shape in view of a design.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal comprising:
    a circuit board for mounting a main antenna, for processing a signal to be radiated, and for outputting the signal to the main antenna; and
    a housing positioned above the circuit board,
    wherein the housing comprises a metal case having one or more openings for passing through a circumferential area of one or more key buttons,
    wherein an antenna adjacent opening among the one or more openings is extended through a slot toward an edge of the case, and
    wherein a portion forming the slot in the metal case forms a loop with a portion forming the antenna adjacent opening of the metal case in order to radiate, when a signal radiated from the main antenna is output, the output signal.

2. The mobile terminal of claim 1, wherein the housing comprises:
    a front housing disposed on the circuit board and in which a plurality of key buttons are disposed,
    wherein the metal case is disposed at an upper part of the front housing in order to cover the front housing.

3. The mobile terminal of claim 2, wherein the metal case has a structure in which a plurality of openings for exposing the plurality of key buttons are formed.

4. The mobile terminal of claim 3, wherein the opening with a shape of a loop antenna is an opening adjacent to the main antenna among the plurality of openings, and the opening adjacent to the main antenna is extended toward an edge of the case through the slot.

5. The mobile terminal of claim 4, wherein the opening extended through the slot is further extended in another opening direction through another slot.

6. The mobile terminal of claim 2, wherein the metal case has a lattice shape.

7. A mobile terminal comprising:
a circuit board in which an antenna and one or more key buttons are mounted;
a housing positioned above the circuit board; and
a metal case positioned above the housing,
wherein the metal case comprises one or more openings and one or more key buttons corresponding to the one or more openings respectively, and the one or more key buttons are positioned in the one or more openings,
wherein an antenna adjacent opening among the one or more openings is extended through a slot toward an edge of the case, and
wherein a portion forming the slot in the metal case forms a loop with a portion forming the antenna adjacent opening of the metal case.

8. The mobile terminal of claim 7, wherein the metal case has a lattice shape by a portion forming a plurality of openings.

9. The mobile terminal of claim 7, wherein the slot is formed from the antenna adjacent opening to the edge of the metal case.

10. The mobile terminal of claim 7, wherein the slot has an insulating portion forming a microphone hole therein.

11. The mobile terminal of claim 10, wherein the microphone hole exposes a microphone mounted in the circuit board.

12. The mobile terminal of claim 7, wherein the antenna adjacent opening is further extended in a direction of any opening of a plurality of openings through another slot.

\* \* \* \* \*